United States Patent
Tajima

(10) Patent No.: US 8,488,160 B2
(45) Date of Patent: Jul. 16, 2013

(54) IMAGE FORMING APPARATUS AND COMPUTER READABLE MEDIUM STORING PROGRAM

(75) Inventor: Yukio Tajima, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 603 days.

(21) Appl. No.: 12/714,187

(22) Filed: Feb. 26, 2010

(65) Prior Publication Data

US 2011/0043851 A1 Feb. 24, 2011

(30) Foreign Application Priority Data

Aug. 24, 2009 (JP) .................................. 2009-192922

(51) Int. Cl.
*G06F 3/12* (2006.01)

(52) U.S. Cl.
USPC ..................... 358/1.15; 358/1.16; 365/189.05; 711/154; 711/6

(58) Field of Classification Search
None
See application file for complete search history.

(56) References Cited

U.S. PATENT DOCUMENTS

| | | | | |
|---|---|---|---|---|
| 6,952,279 B1 * | 10/2005 | Iida | | 358/1.15 |
| 7,061,631 B2 * | 6/2006 | Ozaki | | 358/1.13 |
| 7,080,166 B2 * | 7/2006 | Yokoyama | | 710/10 |
| 7,437,022 B2 * | 10/2008 | Uchida et al. | | 382/305 |
| 7,640,243 B2 * | 12/2009 | Ogata | | 1/1 |
| 7,864,376 B2 * | 1/2011 | Okamoto et al. | | 358/403 |
| 7,884,972 B2 * | 2/2011 | Morikawa et al. | | 358/426.05 |
| 8,045,197 B2 * | 10/2011 | Fukui et al. | | 358/1.15 |
| 8,134,725 B2 * | 3/2012 | Hasegawa | | 358/1.15 |
| 8,218,180 B2 * | 7/2012 | Shobu | | 358/1.15 |
| 8,345,294 B2 * | 1/2013 | Tomita et al. | | 358/1.16 |
| 2003/0179404 A1 * | 9/2003 | Matsueda | | 358/1.15 |
| 2004/0008366 A1 * | 1/2004 | Ferlitsch | | 358/1.15 |
| 2005/0108549 A1 * | 5/2005 | Kanai | | 713/182 |
| 2005/0195431 A1 * | 9/2005 | Van Den Tillaart et al. | | 358/1.15 |
| 2006/0274358 A1 * | 12/2006 | Fukui et al. | | 358/1.15 |
| 2006/0274359 A1 * | 12/2006 | Fukui et al. | | 358/1.15 |
| 2006/0274360 A1 * | 12/2006 | Fukui et al. | | 358/1.15 |
| 2007/0014612 A1 * | 1/2007 | Kim | | 400/61 |
| 2007/0083516 A1 * | 4/2007 | Ogata | | 707/8 |
| 2007/0106902 A1 * | 5/2007 | Miyata | | 713/176 |
| 2007/0201082 A1 * | 8/2007 | Fukui et al. | | 358/1.15 |
| 2007/0229879 A1 * | 10/2007 | Harmon et al. | | 358/1.15 |
| 2007/0229895 A1 * | 10/2007 | Fujimori et al. | | 358/1.16 |
| 2007/0253018 A1 * | 11/2007 | Doui | | 358/1.15 |

(Continued)

FOREIGN PATENT DOCUMENTS

JP 2003-234870 A 8/2003

OTHER PUBLICATIONS

Author: David J. Kappos, Title: Subject Matter Eligibility of Computer Readable Media, Date: Feb. 23, 2010, Publisher: US Patent and Trademark Office, 1351 OG 212.*

(Continued)

*Primary Examiner* — King Poon
*Assistant Examiner* — Ted Barnes
(74) *Attorney, Agent, or Firm* — Sughrue Mion, PLLC

(57) ABSTRACT

An image forming apparatus includes: a memory that memorizes a storage area storing document data; a receiving unit that receives an instruction for creating a second storage area corresponding to a first storage area created by another image forming apparatus; and a creating unit that creates the second storage area associated with information for identifying another image forming apparatus in the memory when the receiving unit receives the instruction to create the second storage area.

4 Claims, 10 Drawing Sheets

U.S. PATENT DOCUMENTS

| | | | |
|---|---|---|---|
| 2008/0055661 A1* | 3/2008 | Yoshida | 358/403 |
| 2008/0137441 A1* | 6/2008 | Morikawa et al. | 365/189.05 |
| 2008/0204796 A1* | 8/2008 | Kitamura et al. | 358/1.15 |
| 2009/0310174 A1* | 12/2009 | Ozawa et al. | 358/1.15 |
| 2010/0157371 A1* | 6/2010 | Miyata | 358/1.15 |
| 2010/0195136 A1* | 8/2010 | Shudo | 358/1.14 |

OTHER PUBLICATIONS

David Kappos, Subject Matter Eligibility of Computer Readable Media, US Patent and Trademark Office, Feb. 23, 2010, 1351 OG 212.*

* cited by examiner

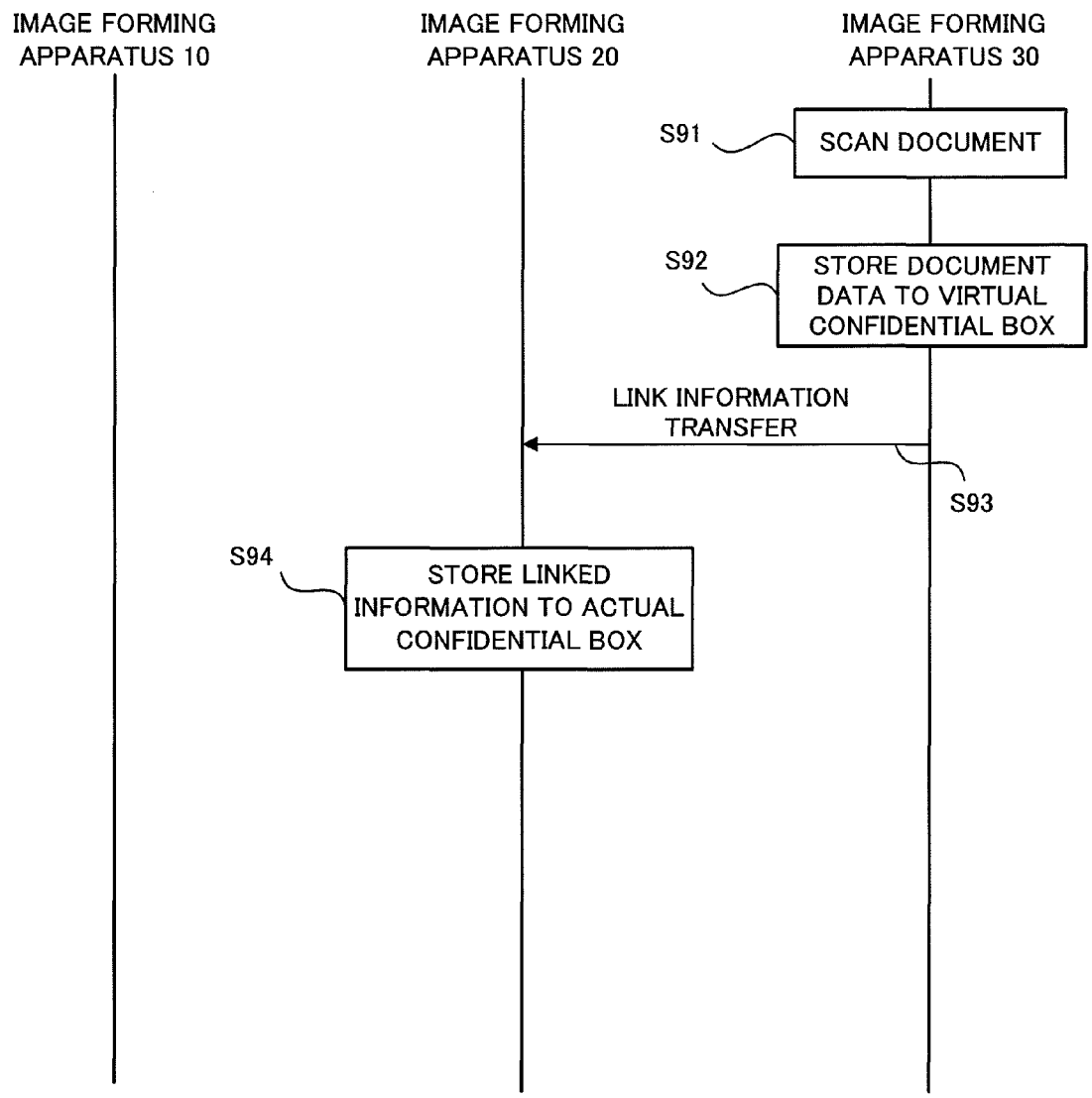

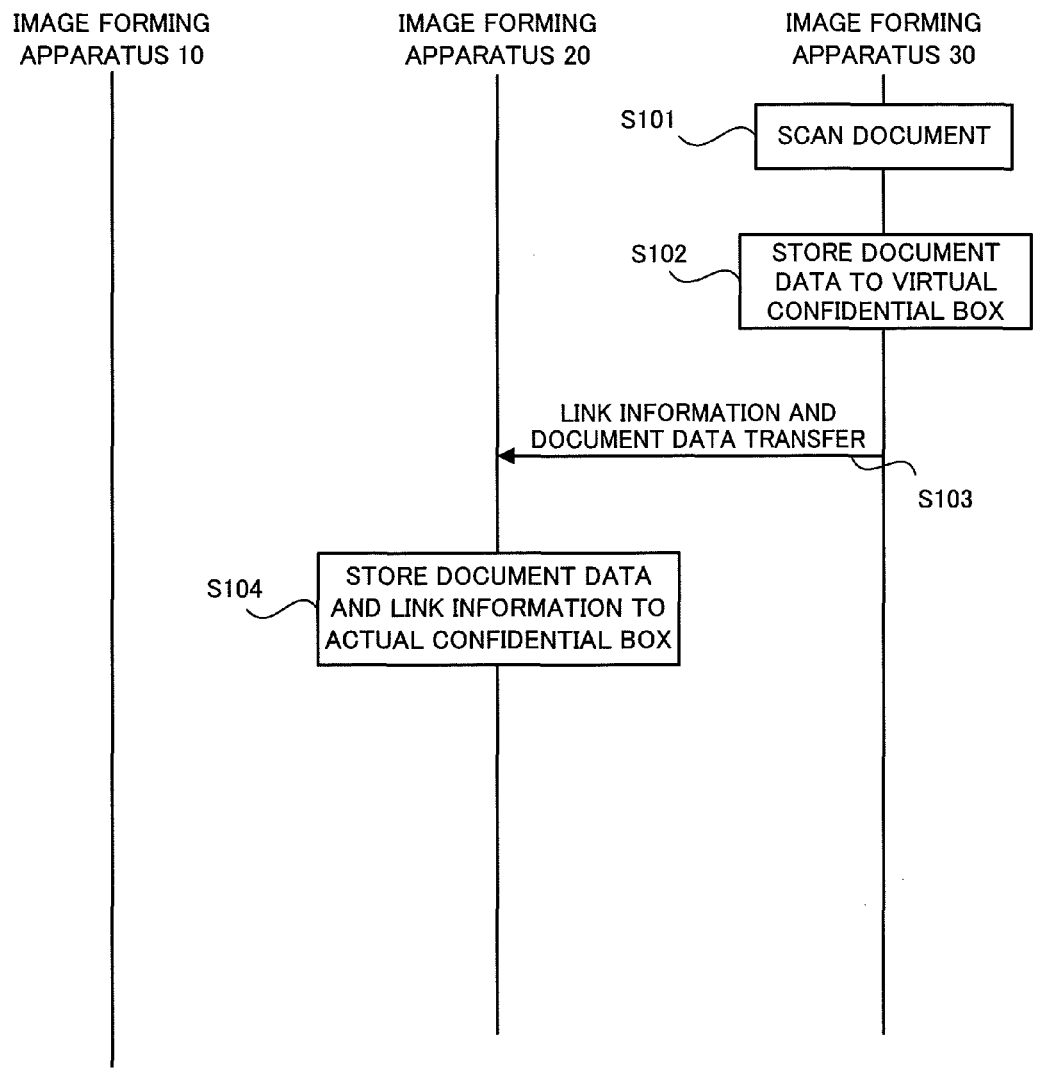

//  IMAGE FORMING APPARATUS AND COMPUTER READABLE MEDIUM STORING PROGRAM

CROSS-REFERENCE TO RELATED APPLICATIONS

This application is based on and claims priority under 35 USC 119 from Japanese Patent Application No. 2009-192922 filed Aug. 24, 2009.

BACKGROUND

TECHNICAL FIELD

The present invention relates to an image forming apparatus and a computer readable medium storing a program.

SUMMARY

According to an aspect of the invention, there is provided an image forming apparatus, comprising: a memory that memorizes a storage area storing document data; a receiving unit that receives an instruction for creating a second storage area corresponding to a first storage area created by another image forming apparatus; and a creating unit that creates the second storage area associated with information for identifying another image forming apparatus in the memory when the receiving unit receives the instruction to create the second storage area.

BRIEF DESCRIPTION OF THE DRAWINGS

An exemplary embodiment of the present invention will be described in detail based on the following figures, wherein:

FIG. 9 is a sequence chart explaining an operation in the case that an image forming system according to a second exemplary embodiment of the present invention scans a document to store the document data to the virtual confidential box; and FIG. 10 is a sequence chart explaining another operation in the case that an image forming apparatus system according to the second exemplary embodiment of the present invention scans a document to store the document data to the virtual confidential box.

DETAILED DESCRIPTION

Next, an exemplary embodiment of the present invention will be described in detail below with reference to drawings.

[First Exemplary Embodiment]

Figure 1:
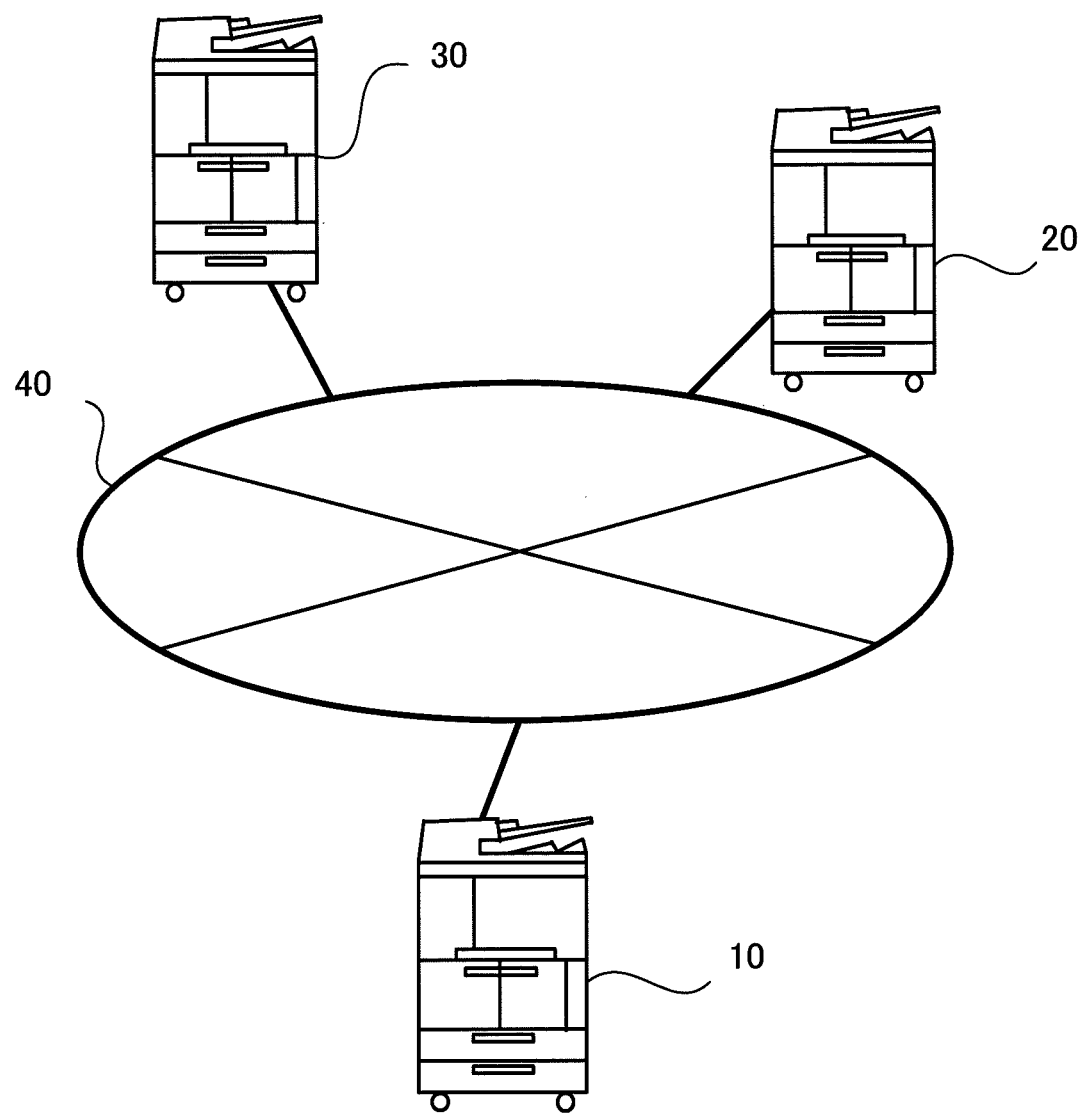
FIG. 1 is a diagram illustrating a system configuration of an image forming apparatus according to a first exemplary embodiment of the present invention.

FIG. 1 is a diagram illustrating a configuration of an image forming apparatus according to the first exemplary embodiment of the present invention.

An image forming system according to the first exemplary embodiment of the present invention includes plural image forming apparatuses 10, 20, and 30 connected each other via a network 40 as shown in FIG. 1. Note that however the three image forming apparatuses 10, 20, and 30 are illustrated in the exemplary embodiment of the present invention, it is not limited to the number of image forming apparatuses in the present invention. Therefore, the image forming system having at least two or more image forming apparatuses may be applicable in the exemplary embodiment. Note that the image forming apparatuses 10, 20, and 30 are multifunction printers having plural function such as printing, scanning, copying, and faxing.

Figure 2:
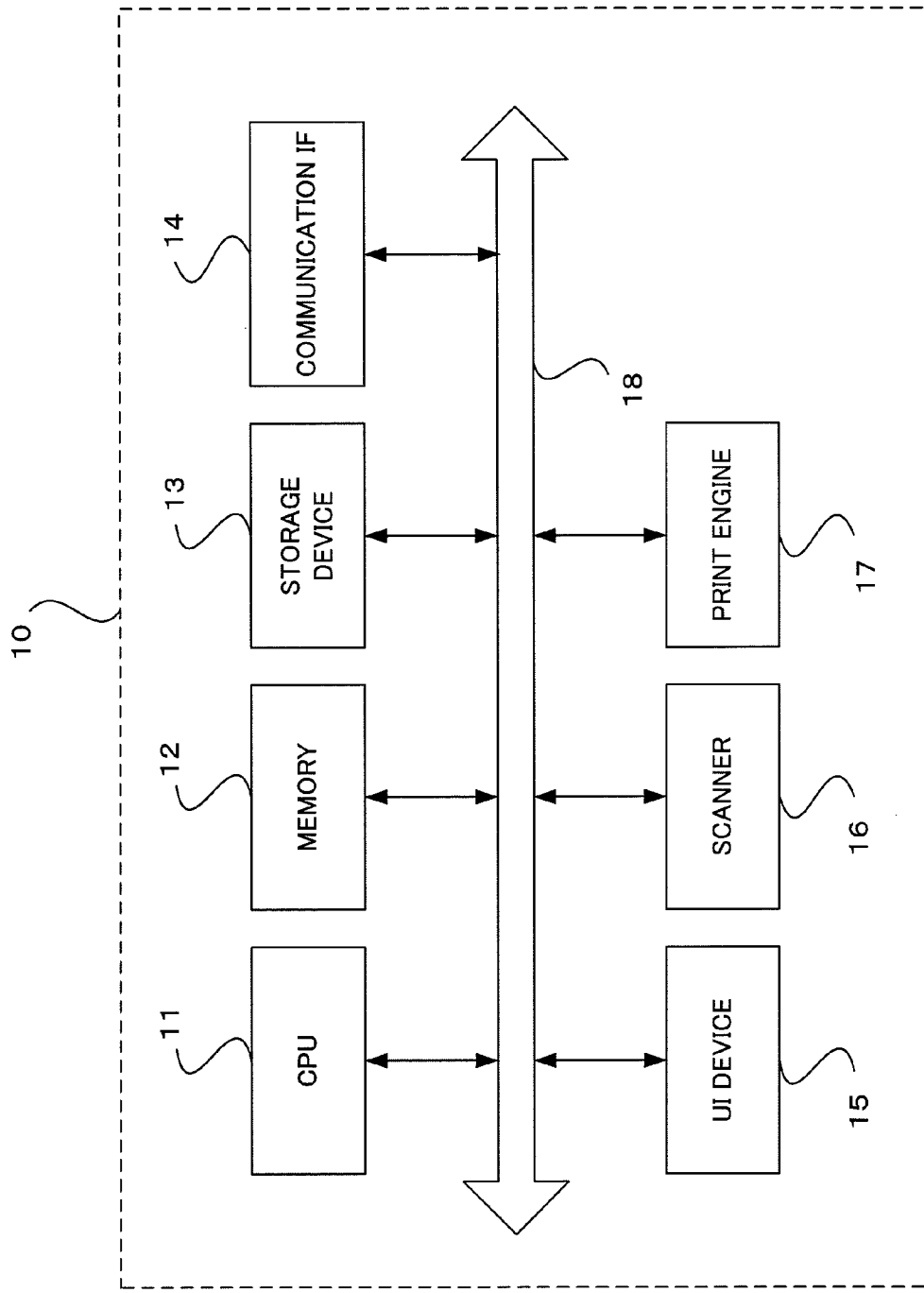
FIG. 2 is a diagram illustrating a hardware configuration of an image forming apparatus 10 according to the first exemplary embodiment of the present invention.

Next, a hardware configuration of the image forming apparatus 10 in the image forming system according to the first exemplary embodiment is illustrated in FIG. 2. Regarding the hardware configuration of the image forming apparatuses 20 and 30, the description is omitted due to the same configuration as the image forming apparatus 10.

As shown in FIG. 2, the image forming apparatus 10 has a central processing unit (CPU) 11, memory 12, a storage device 13 such as a hard disk drive (HDD), a communication interface (IF) 14 transmitting and receiving data to and from other image forming apparatuses 20 and 30 via a network 40, an user interface (UI) device 15 including a touch panel or a liquid crystal display and a keyboard, a scanner 16, and a print engine 17. These components are connected with each other via a control bus 18.

The CPU 11 executes a prescribed processing in the basis of a control program stored in the memory 12 or the storage device 13 to control an operation of the image forming apparatus 10.

Note that the control program executed by the CPU 11 may be stored in a storage medium such as CD-ROM though the above description explains that the control program stored in the memory 12 or the storage device 13 is read by the CPU 11 in the exemplary embodiment.

Figure 3:
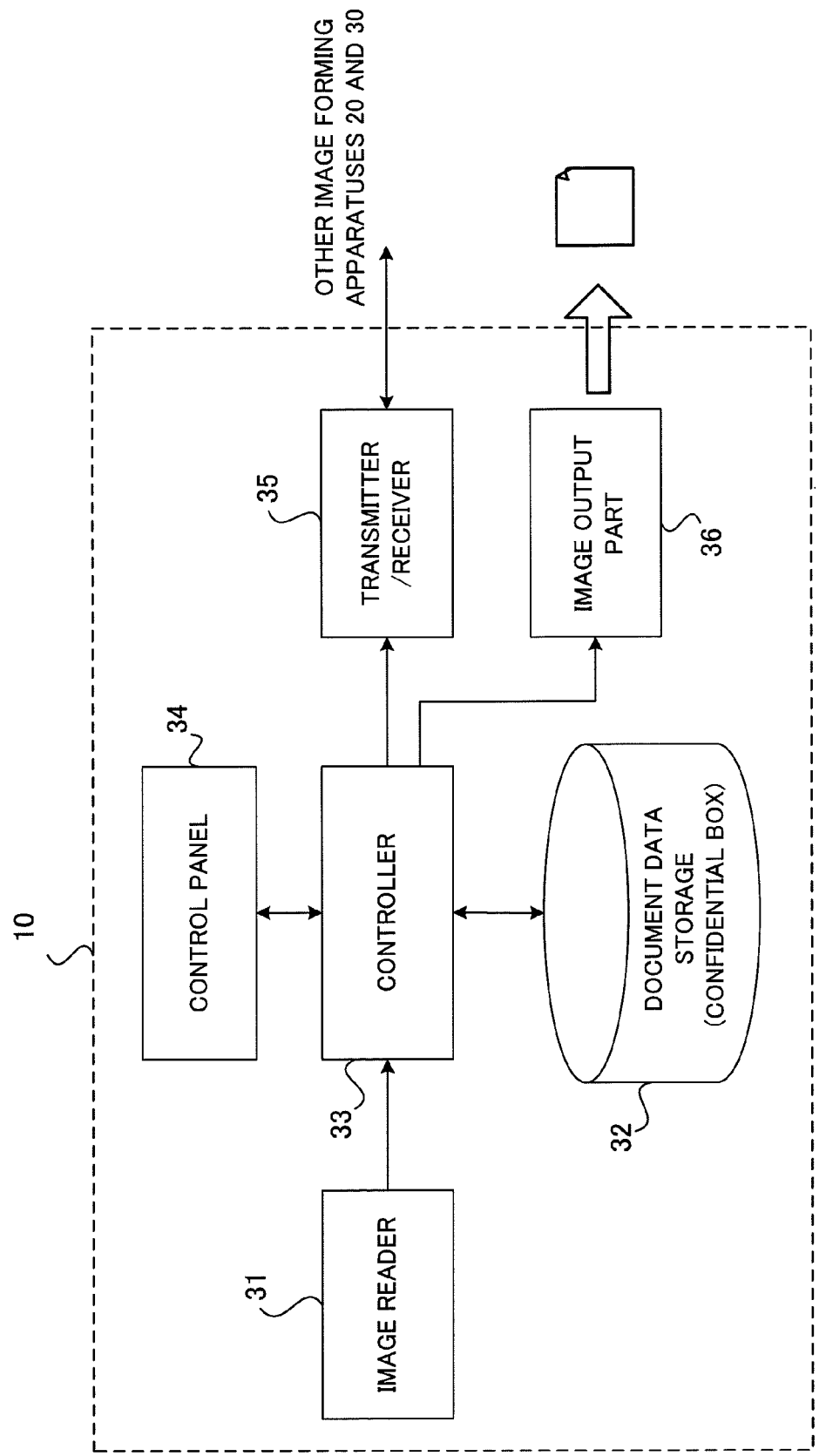
FIG. 3 is a diagram illustrating a functional configuration of the image forming apparatus 10 according to the first exemplary embodiment of the present invention.

FIG. 3 is a diagram illustrating a functional configuration of the image forming apparatus 10 performing at the time that the above-mentioned control program is executed.

The image forming apparatus 10 of the first exemplary embodiment has an image reader 31, a document data storage 32, a controller 33, a control panel 34, a transmitter and receiver 35, and an image output part 36 as shown in FIG. 3.

The image reader 31 reads a document image to convert to document data. The document data storage 32 stores a confidential box (storage area) storing document data.

The control panel 34 including a touch panel and the like has a displaying function and an inputting function for inputting an instruction of a user. The transmitter and receiver 35 transmits and receives data to and from the image forming apparatuses 20 and 30. The image output part 36 outputs the document data on a print sheet based on the instruction received from the controller 33.

When a confidential box (first storage area) is newly created in the document data storage 32, the controller 33 directs other image forming apparatuses 20 and 30 respectively connected to a network 40 to create a virtual conferential box (second storage area) in accordance with the first storage area.

Note that in the following description, the confidential box firstly created is described as an actual confidential box and the confidential box corresponding to the actual confidential box is described as the virtual confidential box. The actual confidential box provides storage for actual data, and the virtual confidential box provides storage for information such as address used for identifying an image forming apparatus which has the actual confidential box corresponding to the virtual confidential box.

Further, when receiving an instruction to create a virtual confidential box from another image forming apparatuses 20 or 30 via the transmitter and receiver 35, the controller 33 creates the virtual confidential box binding the information for identifying the image forming apparatuses 20 or 30 in the document data storage. 32.

Further when receiving an instruction to store document data to the virtual confidential box in the document data storage 32, the controller 33 identifies either of the image forming apparatus 20 or 30 including the actual confidential box corresponding to the virtual confidential box base on the information associated with the virtual confidential box.

Subsequently, the transmitter and receiver 35 transfers the document data to the image forming apparatus identified by the controller 33.

Additionally, when the virtual confidential box in the document data storage 32 is designated via the control panel 34, the controller 33 identifies either of the image forming apparatus 20 or 30 having the actual confidential box corresponding to the virtual confidential box based on the information associated with the virtual confidential box.

Subsequently, the transmitter and receiver 35 transmits the document list requirement for requiring the list information of the document data stored in the actual confidential box corresponding to the designated virtual confidential box to the image forming apparatus identified by the controller 33.

Further the controller 33 controls the control panel 34 to display the list information of the document data received via the transmitter and receiver 35.

Further, when an instruction to output the document data of the list information displayed on the control panel 34 is done, the controller 33 directs the image forming apparatus having the actual confidential box storing the designated document data to output.

In the same manner, when an instruction to delete the document data in the list information displayed on the control panel 34 is done, the controller 33 directs the image forming apparatus having the actual confidential box to storing the designated document data to delete.

Additionally, when the virtual confidential box or the actual confidential box stored in the document data storage 32 is deleted, the controller 33 directs other image forming apparatus 20 or 30 via the transmitter and receiver 35 to delete the confidential box corresponding to the deleted box, the virtual confidential box or the actual confidential box.

Figure 4:
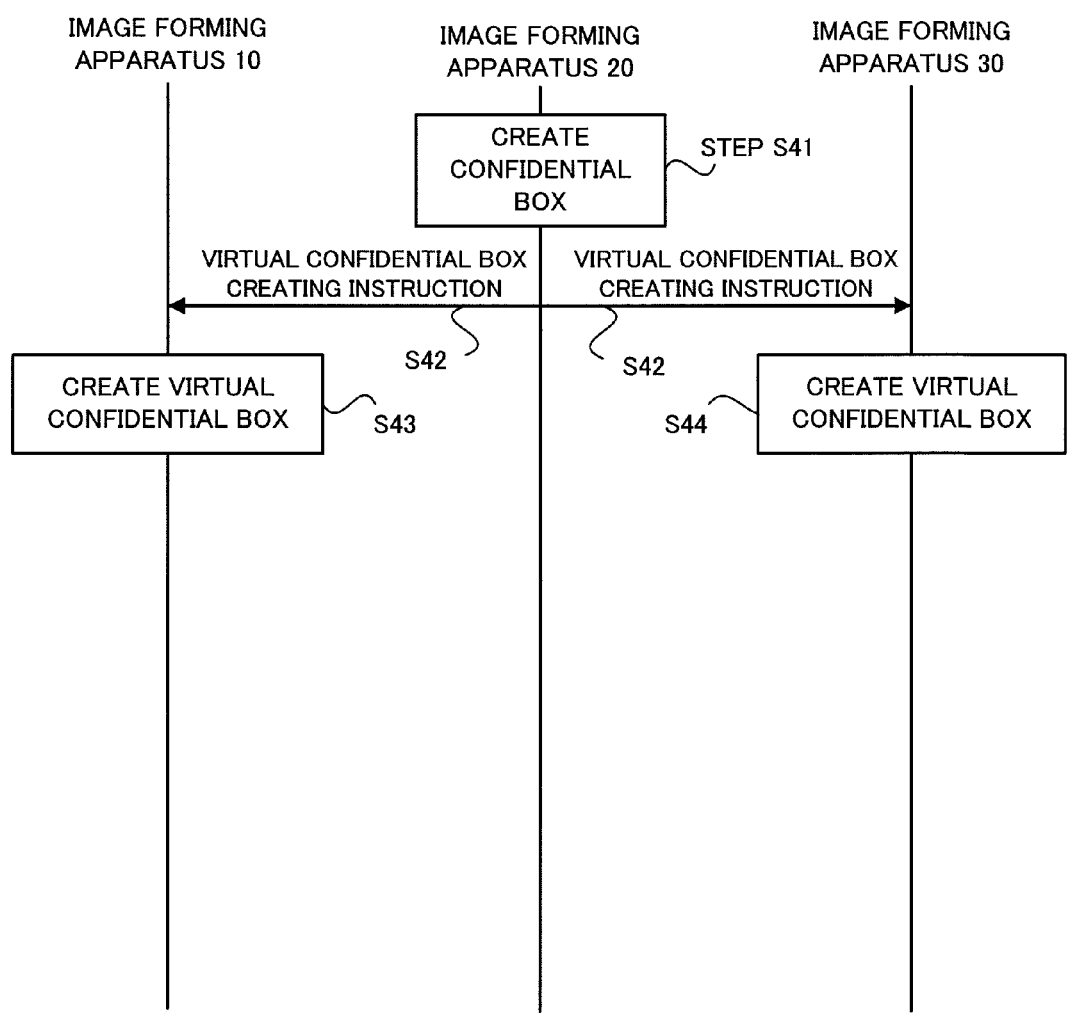
FIG. 4 is a sequence chart explaining an operation in an image forming apparatus 20 in the case that a confidential box is newly created.

Next, an operation of the image forming system according to the exemplary embodiment of the present invention will be described in detail below with reference to drawings. First, an operation in the case that a newly confidential box is created in the image forming apparatus 20 will be described in the sequence chart of FIG. 4.

When the processing of creating a confidential box is performed in the image forming apparatus 20 (STEP 41), the image forming apparatus 20 transmits an instruction to create the virtual confidential box to the image forming apparatus 10 and 30 connected to the network 40 (STEP S42).

After the receipt of the creating instruction of the virtual confidential box, the image forming apparatus 10 creates the virtual confidential box associated with the information identifying the image forming apparatus (STEP S43). In the same manner, the image forming apparatus 30 receives the creating instruction for the virtual confidential box, and creates the virtual confidential box associated with the information identifying the image forming apparatus 20 (STEP S44).

Figure 5:
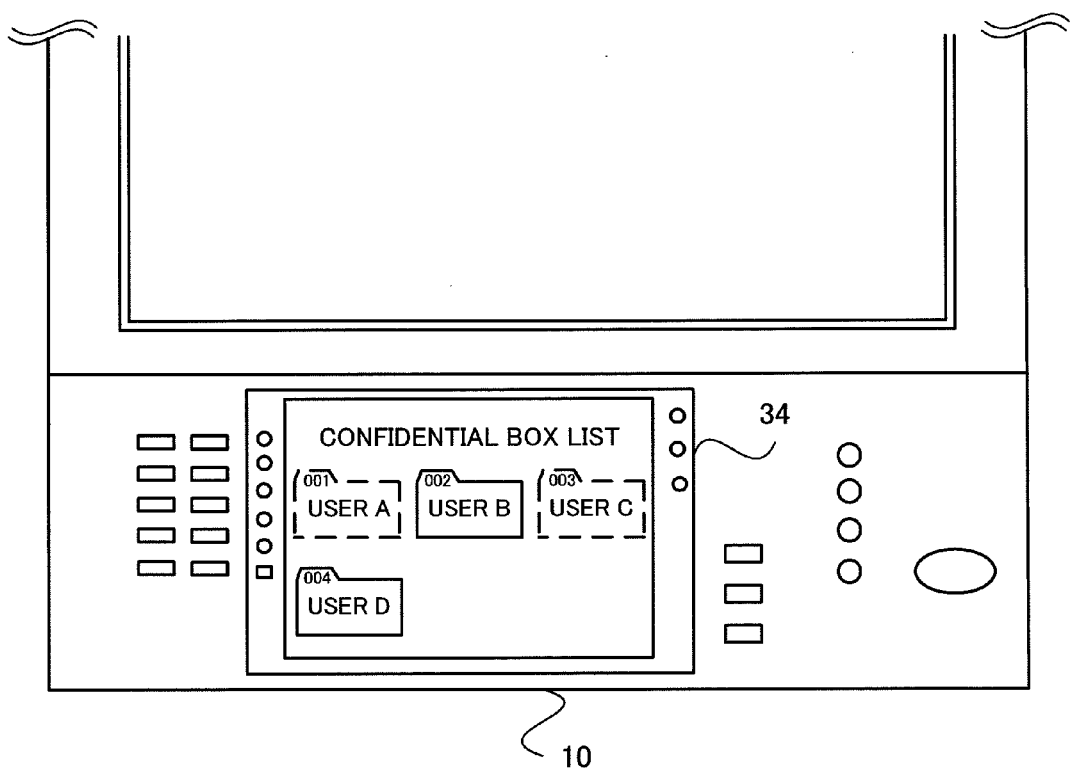
FIG. 5 is a diagram illustrating a display example of an actual confidential box and a virtual confidential box that are displayed.

FIG. 5 provides a display example illustrating the actual confidential box and the virtual confidential box created in the above-mentioned manner. The display example in FIG. 5 illustrates a confidential box list displayed on the control panel 34 of the image forming apparatus 10. A confidential box in solid line represents the actual confidential box, and a confidential box in dotted line represents the virtual confidential box. As shown in the display example of FIG. 5, the actual confidential boxes for USER B and USER D, and the virtual confidential boxes for USER A and USER C are respectively created in the document data storage 32 of the image forming apparatus 10.

Figure 6:
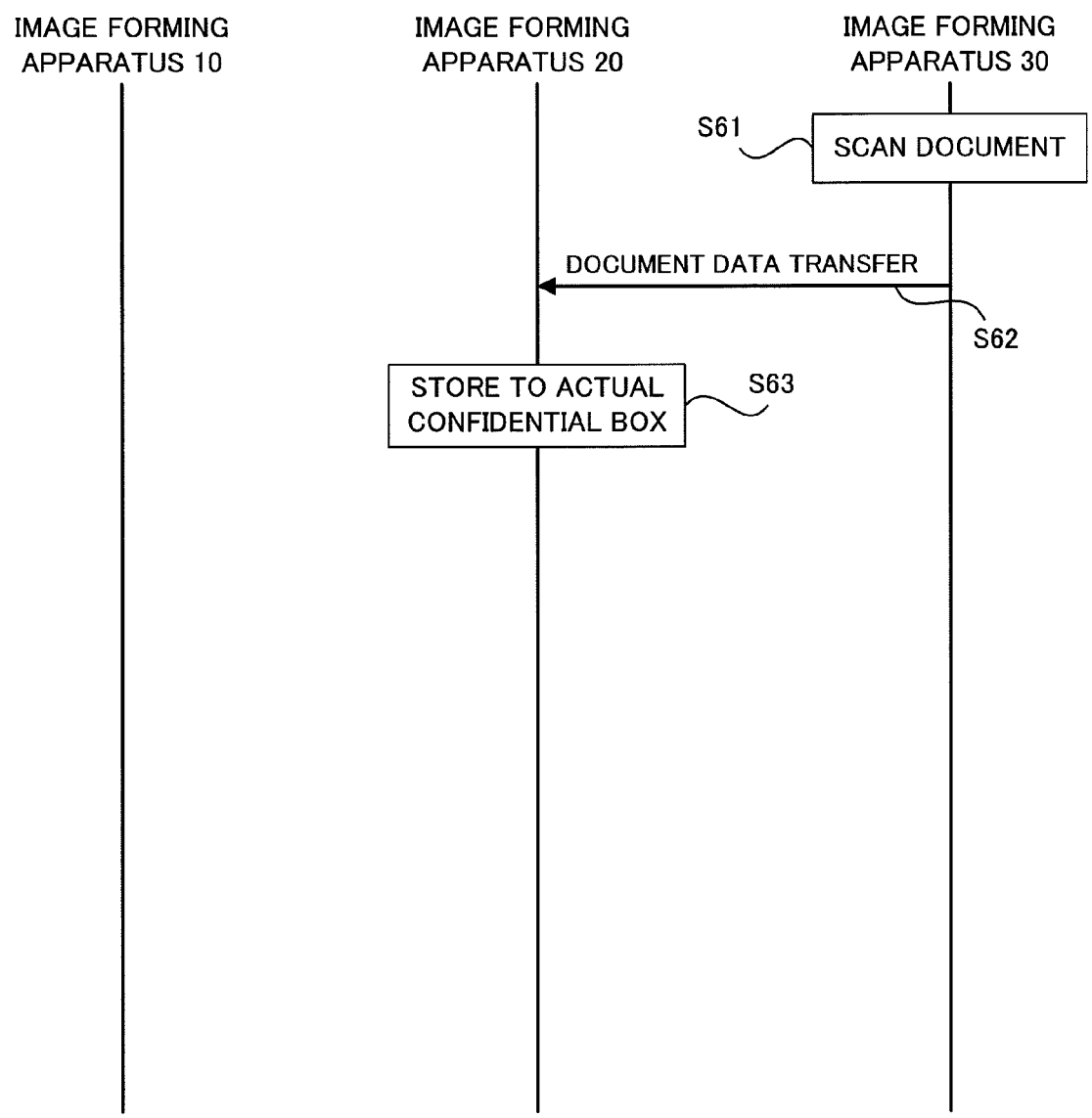
FIG. 6 is a sequence chart explaining an operation in the case that an image forming apparatus 30 scans a document to store the document data to the virtual confidential box.

Next, an operation in the case that the document data obtained by scanning a document in the image forming apparatus 30 is stored to a virtual confidential box will be described in the sequence chart of FIG. 6.

First, when a document is scanned in the image forming apparatus 30 following a designation of the virtual confidential box (STEP S61), the image forming apparatus 30 transfers the scanned document data to the image forming apparatus 20 identified by the stored information associated with the designated virtual confidential box (STEP S62). Secondly, the document data transferred is stored to the actual confidential box of the image forming apparatus 20 corresponding to the designated virtual confidential box in scanning (STEP S63).

Figure 7:
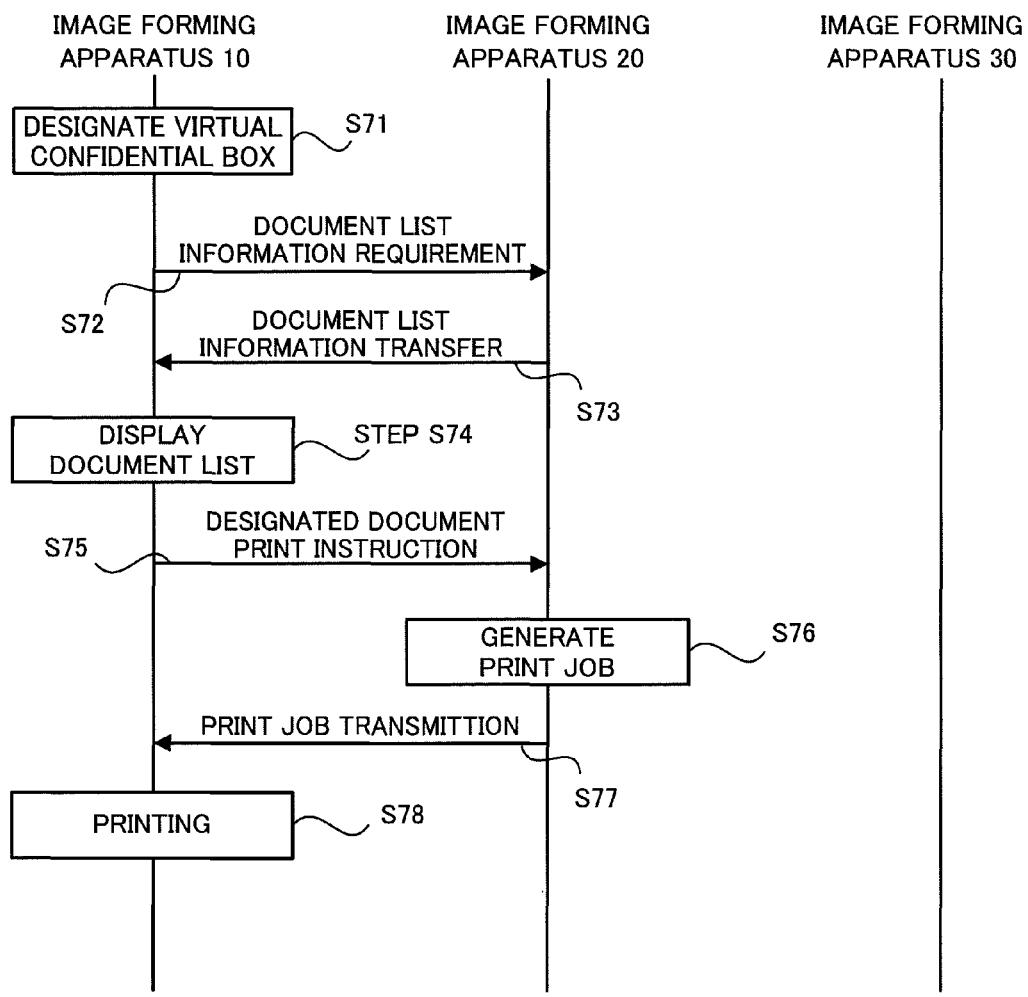
FIG. 7 is a sequence chart explaining an operation in the case that the image forming apparatus 10 outputs a document stored in the selected virtual confidential box.

Next, an operation in the case that a document is outputted by the designation of the virtual confidential box in the image forming apparatus 10 will be described in the sequence chart of FIG. 7.

First, when a virtual confidential box displayed on the control panel 34 in the image forming apparatus 10 is designated (STEP S71), the image forming apparatus 20 having the actual confidential box corresponding to the designated virtual confidential box is identified in accordance with the stored information associated with the designated virtual confidential box. Further, the image forming apparatus 10 transmits a requirement for obtaining the document data list information stored in the actual confidential box to the image forming apparatus 20 (STEP S72).

Note that when the image forming apparatus 20 is powered off at the time that the image forming apparatus 10 transmits the requirement, it may be applicable to notify the user of the identified image forming apparatus having the actual confidential box by an message indication, e.g. "Power up the image forming apparatus 20" on the control panel 34.

When the image forming apparatus 20 receives the document list information requirement, the image forming apparatus 20 generates the document list information based on the document data stored in the actual confidential box to transfer to the image forming apparatus 10 (STEP S73). Then the transferred document list information is displayed on the control panel 34 in the image forming apparatus 10 (STEP S74).

When the user refers to the displayed document list information on the control panel 34 and instructs to print the document data, the printing instruction is transmitted to the image forming apparatus 20 (STEP S75). After the receipt of the printing instruction, the image forming apparatus 20 generates a print job for printing the stored document data (STEP S76) to transmit to the image forming apparatus 10 (STEP S77).

After the receipt of the printing job from the image forming apparatus 20, the image forming apparatus 10 executes printing in accordance with the received printing job (STEP S78).

Figure 8:
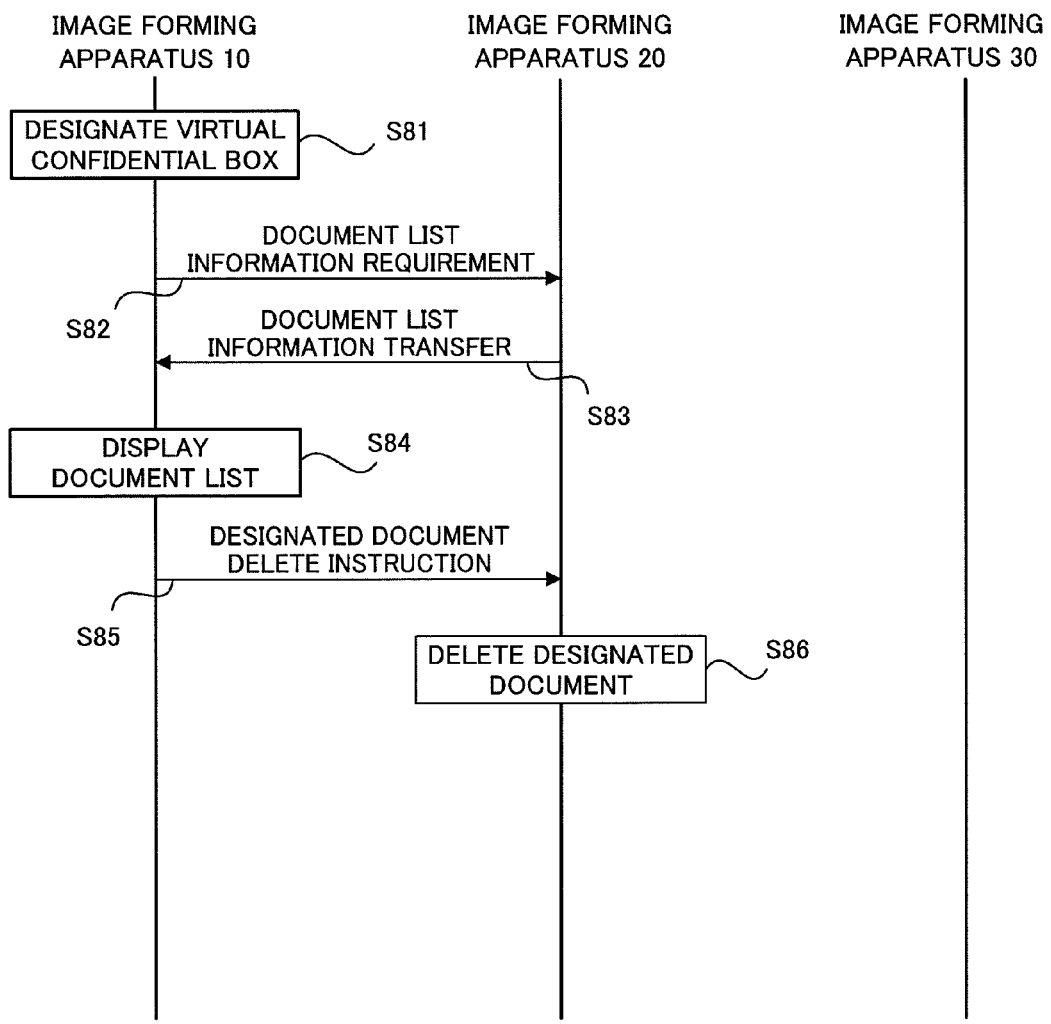
FIG. 8 is a sequence chart explaining an operation in the case that document data is deleted from the confidential box.

Next, an operation in the case that a document data stored in a confidential box is deleted will be described in the sequence chart of FIG. 8.

First, when the virtual confidential box displayed on the control panel 34 of the image forming apparatus 10 is designated (STEP S81), the image forming apparatus 20 having the actual confidential box corresponding to the designated virtual confidential box is identified in accordance with the stored information associated with the designated virtual confidential box. Further, the image forming apparatus 10 transmits a requirement for obtaining the document data list information stored in the actual confidential box to the image forming apparatus 20 (STEP S82).

When the image forming apparatus 20 receives the document list information requirement, the image forming apparatus 20 generates the document list information based on the document data stored in the actual confidential box to transfer the image forming apparatus 10 (STEP S83). Then the transferred document list information is displayed on the control panel 34 in the image forming apparatus 10 (STEP S84).

When the user refers to the displayed document list information on the control panel 34 and instructs to delete the document data, the deleting instruction is transmitted to the image forming apparatus 20 (STEP S85). Then the image forming apparatus 20 receives the deleting instruction, and executes deleting the designated document data of every document data stored in the actual confidential box (STEP S86).

Although the description herein explains the exemplary embodiment for only one actual confidential box actually storing the document data, two or more actual confidential box may be disposed on the system in the exemplary embodiment, of the present invention. For example, if generated two actual confidential boxes on the system, one is as a main box, and another is as a sub box. Accordingly, each of the virtual confidential boxes corresponding to the main box or the sub box respectively stores information such as address information for the image forming apparatus having the main box or sub box. Further if the image forming apparatus having the main actual confidential box can not communicate due to such as powering off, the image forming apparatus having the sub actual confidential box alternatively transmits and receives the subject data.

[Second Exemplary Embodiment]

Next, an image forming system of the second exemplary embodiment according to the present invention will be described. The image forming system according to the second exemplary embodiment is configured similar to the basic system configuration of the first exemplary embodiment mentioned above. However, the difference with the system of the first exemplary embodiment is that the system of the second exemplary embodiment performs the storage of document data in the virtual confidential box for reducing the number of transferring document data.

An operation in the case that document data which is obtained by scanning of a document in the image forming system of the exemplary embodiment is stored to the virtual confidential box will be described in the sequence chart of FIG. 9.

First, when a document is scanned following the designation of the virtual confidential box in the image forming apparatus 30 (STEP S91), the scanned document data is stored in the virtual confidential box of the image forming apparatus 30 (STEP S92). Then, link information for linking with the virtual document data is simply transferred to the image forming apparatus 20 having the actual confidential box (STEP S93). The transferred link information is stored in the actual confidential box of the image forming apparatus 20 (STEP S94).

The link information may not include only the address information of the image forming apparatus having the virtual confidential box and the virtual confidential box number, but also information such as the number of documents stored in the virtual confidential box, and the number of pages and page size in each document.

An another operation in the case that document data which is obtained by scanning of a document in the image forming system of the exemplary embodiment is stored to the virtual confidential box will be described in the sequence chart of FIG. 10.

When a document is scanned in the image forming apparatus 30 following a designation of the virtual confidential box (STEP S101), the scanned document data is stored in the virtual confidential box of the image forming apparatus 30 (STEP S102). Then, link information for linking with the virtual document data and the document data are transferred to the image forming apparatus 20 having the actual confidential box (STEP S103). The transferred link information and the document data are stored in the actual confidential box of the image forming apparatus 20 (STEP S104).

[Modified Exemplary Embodiment]

The exemplary embodiment of the present invention is not limited to the above-mentioned exemplary embodiments in the case that the image forming apparatuses 10, 20, and 30 respectively insist of same configuration. Thus, in the exemplary embodiment of the present invention, it may be applicable that e.g. only the image forming apparatus 20 creates the actual confidential box, and the image forming apparatuses 10 and 30 respectively have the virtual confidential box simply. In this case, the image forming apparatus 20, having the actual confidential box in the document data storage 32, and instructs other image forming apparatuses 10 and 30 connected with network 40 each other to create the virtual confidential box corresponding to the actual confidential box. When the image forming apparatuses 10 and 30 receive the instruction for creating the virtual confidential box from the image forming apparatus 20, respectively creating the virtual confidential box associated with the information for identifying the image forming apparatus 20 on the storage unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalent.

What is claimed is:

1. An image forming apparatus, comprising:
a memory;
a receiving unit that receives an instruction for creating a second storage area in the memory corresponding to a first storage area created by another image forming apparatus;
a creating unit that creates, in the memory, the second storage area associated with information for identifying the other image forming apparatus in response to the receiving unit receiving the instruction to create the second storage area;
an identifying unit that identifies the other image forming apparatus based on the information associated with the second storage area in response to receiving an instruction to output data from the second storage area, wherein the second storage area is a virtual storage area corresponding to the first storage area which is an actual storage area in the other image forming apparatus;
a transmitting unit that transmits, to the identified other image forming apparatus, a document list requirement requesting document data list information stored in the first storage area corresponding to the second storage area;
a display that displays the document data list information in response to receiving the document data list information from the identified other image forming apparatus, wherein the receiving unit receives an output instruction to output document data from among the displayed document data list information; and
an output instruction unit that instructs the identified other image forming apparatus to output the document data in response to receiving the output instruction to output the document data from among the displayed document data list information.

2. An image forming apparatus, comprising:
a memory;
a receiving unit that receives an instruction for creating a second storage area in the memory corresponding to a first storage area created by another image forming apparatus;
a creating unit that creates, in the memory, the second storage area associated with information for identifying the other image forming apparatus in response to the receiving unit receiving the instruction to create the second storage area;
an identifying unit that identifies the other image forming apparatus based on the information associated with the second storage area in response to receiving an instruction to delete data from the second storage area, wherein the second storage area is a virtual storage area corresponding to the first storage area which is an actual storage area in the other image forming apparatus;
a transmitting unit that transmits, to the identified other image forming apparatus, a document list requirement requesting document data list information stored in the first storage area corresponding to the second storage area;
a display that displays the document data list information in response to receiving the document data list information from the identified other image forming apparatus, wherein the receiving unit receives a delete instruction to delete document data from among the displayed document data list information; and
a delete instruction unit that instructs the identified other image forming apparatus to delete the document data in response to receiving the delete instruction to delete the document data from among the displayed document data list information.

3. A non-transitory computer readable medium storing a program causing a computer to execute a process for image processing in an image forming apparatus, the process comprising:
receiving an instruction to create a second storage area, in a memory of the image forming apparatus, corresponding to a first storage area created by another image forming apparatus;
creating, in the memory, the second storage area associated with information for identifying the other image forming apparatus in response to receiving the instruction to create the second storage area;
identifying the other image forming apparatus based on the information associated with the second storage area in response to receiving an instruction to output data from the second storage area, wherein the second storage area is a virtual storage area corresponding to the first storage area which is an actual storage area in the other image forming apparatus;
transmitting, to the identified other image forming apparatus, a document list requirement requesting document data list information stored in the first storage area corresponding to the second storage area;
displaying the document data list information in response to receiving the document data list information from the identified other image forming apparatus;
receiving an output instruction to output document data from among the displayed document data list information; and
instructing the identified other image forming apparatus to output the document data in response to receiving the output instruction to output the document data from among the displayed document data list information.

4. A non-transitory computer readable medium storing a program causing a computer to execute a process for image processing in an image forming apparatus, the process comprising:
receiving an instruction to create a second storage area, in a memory of the image forming apparatus, corresponding to a first storage area created by another image forming apparatus;
creating, in the memory, the second storage area associated with information for identifying the other image forming apparatus in response to receiving the instruction to create the second storage area;
identifying the other image forming apparatus based on the information associated with the second storage area in response to receiving an instruction to delete data from the second storage area, wherein the second storage area is a virtual storage area corresponding to the first storage area which is an actual storage area in the other image forming apparatus;
transmitting, to the identified other image forming apparatus, a document list requirement requesting document data list information stored in the first storage area corresponding to the second storage area;
displaying the document data list information in response to receiving the document data list information from the identified other image forming apparatus;
receiving a delete instruction to delete document data from among the displayed document data list information; and
instructing the identified other image forming apparatus to delete the document data in response to receiving the delete instruction to delete the document data from among the displayed document data list information.

* * * * *